(12) United States Patent
Suzuki

(10) Patent No.: US 7,103,459 B2
(45) Date of Patent: Sep. 5, 2006

(54) VEHICULAR ABNORMALITY DETECTING DEVICE

(75) Inventor: Satoru Suzuki, Chiryu (JP)

(73) Assignee: DENSO Corporation, Kariya (JP)

( * ) Notice: Subject to any disclaimer, the term of this patent is extended or adjusted under 35 U.S.C. 154(b) by 122 days.

(21) Appl. No.: 10/641,027

(22) Filed: Aug. 15, 2003

(65) Prior Publication Data

US 2004/0044449 A1 Mar. 4, 2004

(30) Foreign Application Priority Data

Aug. 29, 2002 (JP) ............................. 2002-251470

(51) Int. Cl.
*G01M 17/00* (2006.01)
(52) U.S. Cl. ..................... 701/29; 701/30; 701/31; 340/439; 340/500
(58) Field of Classification Search ............... 701/29, 701/31, 33–35, 101–102, 112–114, 30, 107, 701/1; 340/438–439, 500–501, 517, 428, 340/441, 514, 516, 523; 73/116, 117.2, 117.3, 73/118.1, 118.2
See application file for complete search history.

(56) References Cited

U.S. PATENT DOCUMENTS

| | | | | |
|---|---|---|---|---|
| 4,541,386 A * | 9/1985 | Kishi et al. ................. | 123/479 |
| 5,265,468 A * | 11/1993 | Holst et al. ................. | 73/118.1 |
| 5,388,045 A * | 2/1995 | Kamiya et al. ............... | 701/35 |
| 5,506,773 A * | 4/1996 | Takaba et al. ................ | 701/29 |
| 5,758,628 A * | 6/1998 | Wada .......................... | 123/520 |
| 5,826,566 A * | 10/1998 | Isobe et al. ................. | 123/520 |
| 5,880,361 A * | 3/1999 | Taniguchi ................... | 73/118.1 |
| 6,006,146 A * | 12/1999 | Usui et al. .................... | 701/29 |
| 6,055,469 A * | 4/2000 | Shoji et al. ................... | 701/34 |
| 6,087,929 A * | 7/2000 | Charzinski et al. ......... | 340/439 |
| 6,369,468 B1 * | 4/2002 | Goings et al. .............. | 307/125 |
| 2001/0051848 A1 * | 12/2001 | Ito ............................. | 701/114 |
| 2003/0121316 A1 * | 7/2003 | Wakahara ................... | 73/118.1 |
| 2003/0154709 A1 * | 8/2003 | Kadowaki et al. ............ | 60/276 |
| 2004/0210375 A1 * | 10/2004 | Heyse .......................... | 701/93 |

FOREIGN PATENT DOCUMENTS

| JP | 10-252539 | 9/1998 |
|---|---|---|
| JP | 2001-82261 | 3/2001 |

* cited by examiner

*Primary Examiner*—Gertrude A. Jeanglaude
(74) *Attorney, Agent, or Firm*—Nixon & Vanderhye, P.C.

(57) ABSTRACT

Abnormality of a vehicle is detected while the vehicle is being parked. System normality is set when a tank internal pressure is K2 or more for time T1 or more. System abnormality is set when the tank internal pressure is K3 (K3<K2) or more and less than K2 after time T1 and a tank internal temperature variation is less than C1. System interim abnormality is set when an interim abnormality counter reaches M1. The interim abnormality counter is incremented when the tank internal pressure is less than K3 and other predetermined vehicle states suffice.

13 Claims, 8 Drawing Sheets

VEHICULAR ABNORMALITY DETECTING DEVICE

CROSS REFERENCE TO RELATED APPLICATIONS

This application is based on and incorporates herein by reference Japanese Patent Application No. 2002-251470 filed on Aug. 29, 2002.

FIELD OF THE INVENTION

The present invention relates to an abnormality detecting device that automatically activates an electronic control unit to detect abnormality of a vehicle.

BACKGROUND OF THE INVENTION

To enhance safety of a vehicle, malfunction diagnosis is executed by automatically detecting abnormality of the vehicle. The malfunction diagnosis is executed while the vehicle is traveling, i.e., while an engine electronic control unit (engine ECU) of the vehicle is running.

However, while the vehicle is traveling, vehicular states, such as an engine revolution speed, a vehicle speed, an intake air amount, an engine load, a cooling water temperature, and the like, vary too frequently for diagnosis condition to suffice. Frequency of the diagnosis thereby remains small. The engine ECU is therefore periodically diagnosed under a stable state of the vehicle while the vehicle is being parked. While the vehicle is being parked, the vehicle is not swinging or a cooling water temperature is low.

For the malfunction diagnosis during the parking, a function of periodically turning on the engine ECU while an ignition switch is turned off is provided in an in-vehicle device such as a power control device. Here, no power supply to a battery due to stopping the engine sometimes exhibits a problem.

Namely, to execute the diagnosis, an actuator must be activated, but repeatedly consuming power due to activating the actuator leads to shortage of electric voltage of the battery. Here, although decreasing power consumption of actuators used in the diagnosis can be a countermeasure to this, frequency of the diagnosis while the engine is turned off is yet limited.

In addition, a traveling state of the vehicle before being parked affects the diagnosis, so that a countermeasure to this is required. In detail, after long-hour traveling, an internal temperature of a fuel tank may remarkably increase, so that reaching a stable state of the vehicle involves a longer time interval. Here, since accurate diagnosis needs the stable state of the vehicle, a time interval for diagnosis, which is equivalent to a time interval for activating the engine ECU, must be set as being long. However, this exhibits another problem.

In detail, increasing the time interval for activating the engine ECU enables accurately detecting abnormality even after the long-hour traveling. It also enables decreasing frequency of activating the engine ECU. This results in little influence on the battery. However, decreasing frequency of diagnosis due to too long an interval makes it difficult to effectively detect abnormality.

SUMMARY OF THE INVENTION

It is an object of the present invention to provide a vehicular abnormality detecting device that can be accurate, properly frequent, and less power consuming.

To achieve the above object, an abnormality detecting device is provided with the following. An electronic control unit of a vehicle is activated so that an abnormality detecting is executed while the vehicle is being parked. A time interval at which the electronic control unit is activated is set based on a vehicular state. This structure enables the electronic control unit to be activated at a proper timing to detect abnormality. This enables securely detecting vehicle abnormality, which results in enhancing accuracy in malfunction diagnosis. Proper frequency of detecting abnormality restricts excessive activating of the electronic control unit, which results in decreasing power consumption of a battery of the vehicle.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
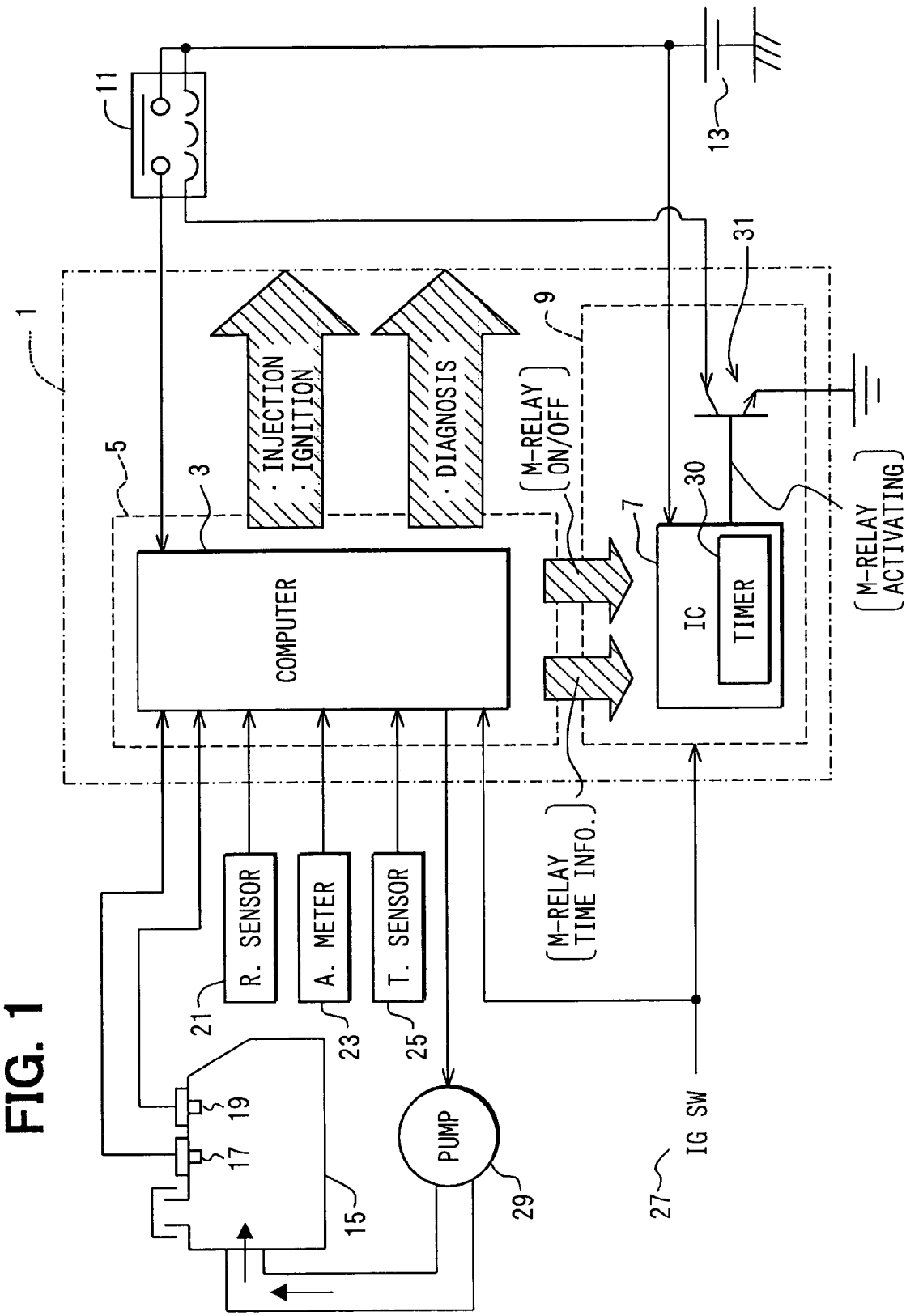
FIG. 1 is a diagram showing system structure of a vehicular abnormality detecting device according to an embodiment of the present invention.

Referring to FIG. 1, a system structure of a vehicular abnormality detecting device 1 of an embodiment will be explained. The system 1 includes an engine electronic control unit (engine ECU) 5 having a known microcomputer 3, and an activating device 9 having a power activating integrated circuit (IC) 7. The microcomputer 3 is powered through a main relay 11 from a battery 13, while the power activating IC 7 is powered directly from the battery 13.

The microcomputer 3 receives several signals indicating parameters as follows: an internal pressure of a fuel tank 15 via a tank internal pressure sensor 17; an internal temperature of the fuel tank 15 via a tank internal temperature sensor 19; an engine revolution speed from a revolution sensor 21; an intake air amount from an air flow meter 23; an engine cooling water temperature from a water temperature sensor 25; and an ON/OFF state of an ignition switch (IG SW) 27 therefrom.

The microcomputer 3 sends out as follows: a pump activating output for activating a pressure pump 29 that increases the internal presser of the fuel tank 15; an injecting output for activating an injector (not shown); an igniting output for activating an ignitor (not shown); and a diagnosis output for notifying an external tool (not shown), by request, of a result of malfunction diagnosis. It also sends out a request output for turning on/off the main relay 11 and time information for activating the main relay 11 to detect abnormality, both of which are sent to the power activating IC 7.

The power activating IC 7 also receives a signal indicating an ON/OFF state of the IG SW 27 therefrom. A memory (RAM) (not shown) of the power activation IC 7 is stored with the time information from the microcomputer 3. This time information indicates timing (diagnosing time) at which the engine ECU 5 automatically starts running, i.e., a time interval from turning off of the IG SW 27 to automatic starting of the engine ECU 5.

The power activating IC 7 having a timer 30 controls the main relay 11 for turning on/off by sending out a main relay activating output to a switching element 31, based on hour information of the timer 30 and the time information from the microcomputer 3. Turning on/off of the main relay 11 leads to tuning on/off of the power supply from the battery to the engine ECU 5, so that the engine ECU 5 automatically turns on/off.

In the next place, operation of the vehicular abnormality detecting device 1 will be explained with dividing it into processings of the microcomputer 3 and the power activating IC 7.

(i) Processing of the Microcomputer 3

(i)-(1) Diagnosis Processing

This is, for detecting vehicle abnormality, in detail, tank hole abnormality, overall processing of setting the diagnosing time from turning off of the IG SW 27 to automatic starting of the engine ECU 5. This processing is executed, e.g., every 64 ms.

Figure 2:
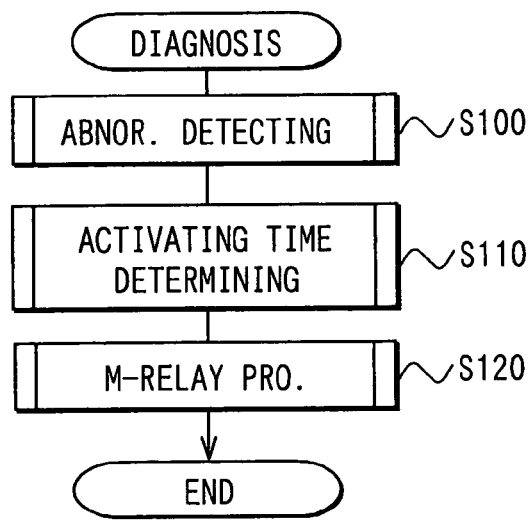
FIG. 2 is a flow chart diagram explaining processing of diagnosis according to the embodiment.

At Step 100, in FIG. 2, after-described tank hole abnormality detecting processing takes place for detecting a hole in the fuel tank 15 developing leakage of fuel vapor.

At Step 110, after-described main relay activating time determining processing takes place for setting a proper diagnosing time according to a state of the vehicle.

At Step 120, after-described main relay processing takes place for sending out the request output for turning on/off the main relay 11 to the power activating IC 7.

The above processings enable detecting tank hole abnormality, setting the proper diagnosing time, sending the request output for tuning on/off the main relay 11, and activating the main relay 11 at the proper timing.

(i)-(2) Tank Hole Abnormality Processing

This is the processing at Step 100 shown in FIG. 2.

Figure 3:
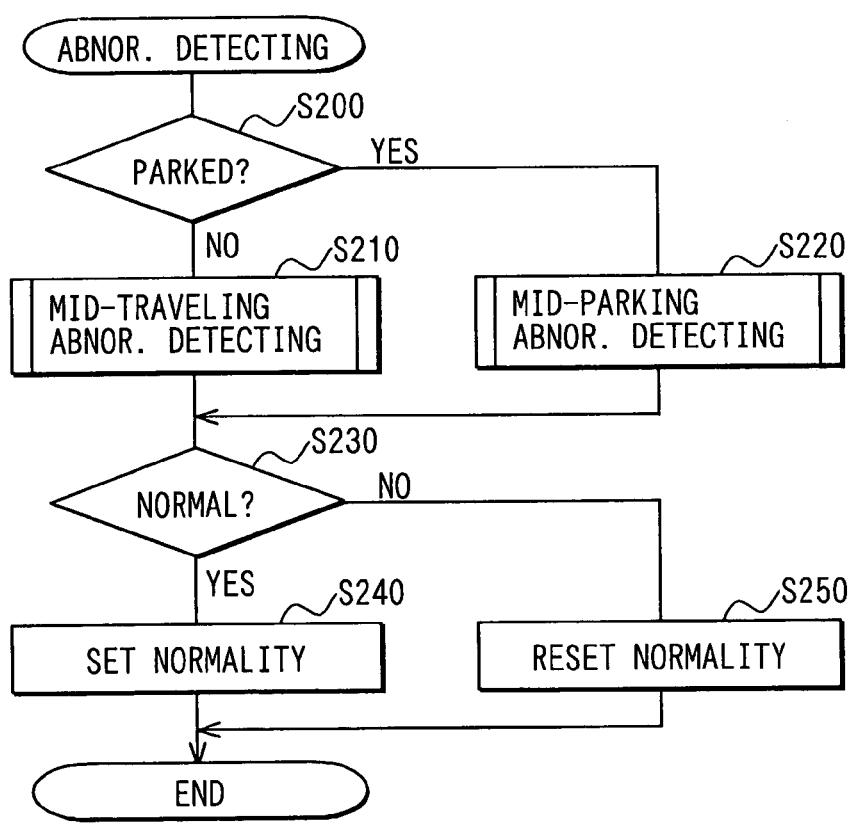
FIG. 3 is a flow chart diagram explaining abnormality detecting processing for a tank hole according to the embodiment.

At Step 200 in FIG. 3, it is determined whether the vehicle is being parked, e.g., from a vehicle speed of zero and an OFF state of the IG SW 27. When the vehicle is determined to be being parked, the processing proceeds to Step 220. Otherwise, the processing proceeds to Step 210.

At Step 210, after-described mid-traveling abnormality detecting processing takes place for detecting abnormality while the vehicle is traveling. Completing this processing leads to entering processing at Step 230.

At Step 220, after-described mid-parking abnormality detecting processing takes place for detecting abnormality while the vehicle is being parked. Completing this processing leads to entering processing at Step 230.

At Step 230, it is determined whether a system is normal, i.e., no tank hole is detected. When the system is determined to be normal, the processing proceeds to Step 240 for setting a normality history. When the system is determined to be not normal, the processing proceeds to Step 250 for resetting a normality history. Completing the processing at Step 240 or 250 leads to terminating the processing. The above processings enable detecting the tank hole abnormality while the vehicle is traveling or being parked.

(i)-(3) Mid-Traveling Abnormality Detecting Processing

This is the processing at Step 210 shown in FIG. 3 for detecting abnormality of the tank hole of the fuel pump while the vehicle is traveling. Rapid decreasing of the internal pressure of the fuel tank 15 that is pressurized by the pressure pump 29 is assumed to result from presence of a tank hole. This case is regarded as abnormality.

Figure 4:
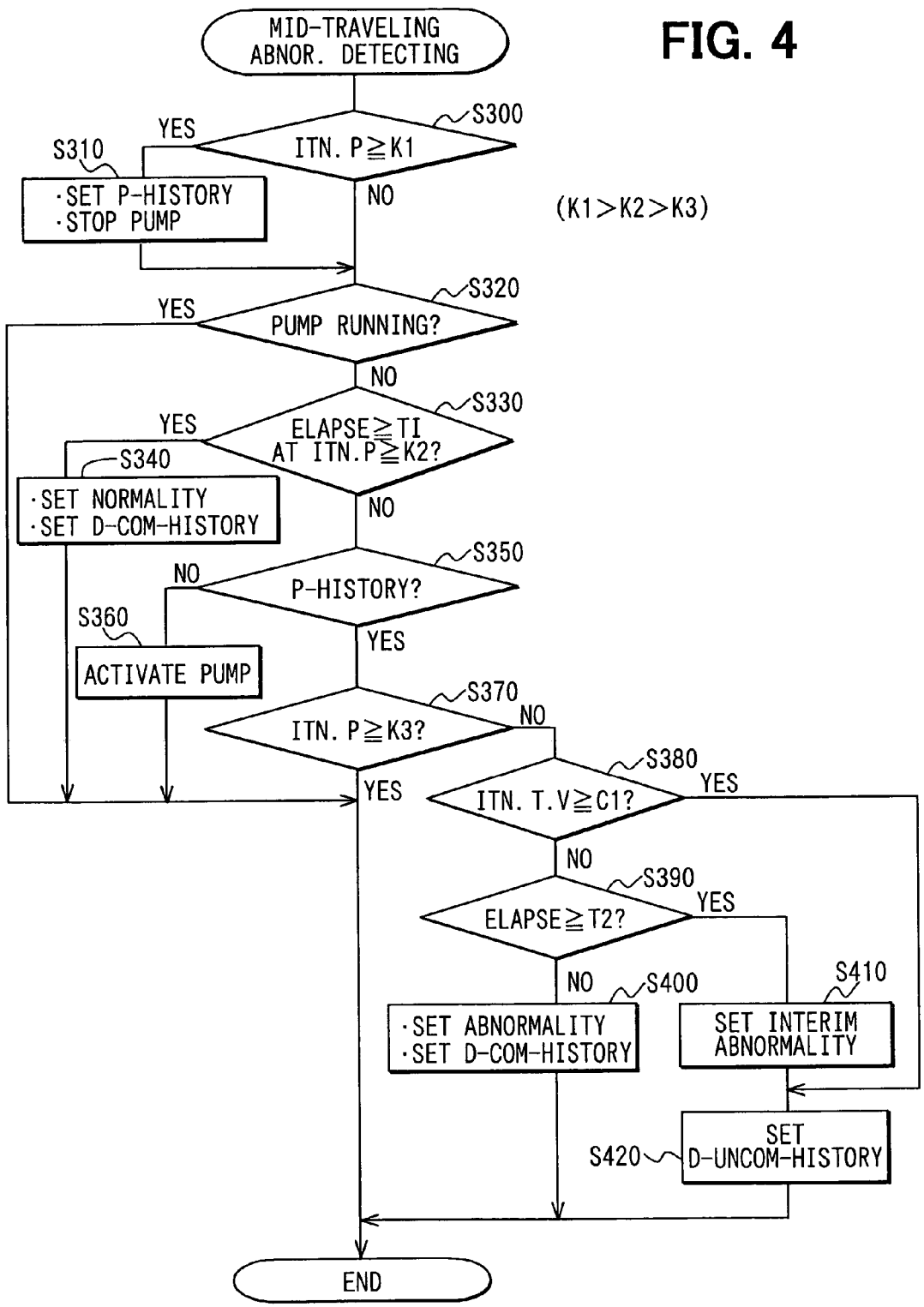
FIG. 4 is a flow chart diagram explaining abnormality detecting processing during traveling according to the embodiment.

At Step 300 in FIG. 4, it is determined whether an internal pressure (ITN. P) of the fuel tank 15 is K1 or more (here, K1>K2>K3), i.e., the internal pressure is sufficiently pressurized to K1 by the pressure pump 29. Affirmation leads the processing to Step 310, while negation leads the processing to Step 320.

At Step 310, a pressurization history (P-HISTORY) is set for indicating that the pressurization is executed, and the pressure pump 29 is turned off. Here and hereafter, setting a history, a piece of information, or a flag means storing the history, the piece of information, or the flag in a memory (not shown), respectively. Information that must be retained even when power is turned off, such as diagnosis information, is stored in a nonvolatile memory.

At Step 320, it is determined whether the pressure pump 29 is running. While the pressure pump 29 is running, abnormality detecting is interrupted. Affirmation thereby terminates the processing, while negation leads the processing to Step 330. When the processing proceeds from Step 310 to Step 320, the pressure pump 29 is turned off. The processing thereby proceeds to Step 330 with negation.

At Step 330, it is determined whether the tank internal pressure remains K2 or more for time T1 or more, i.e., whether the tank internal pressure after pressurized remains in a high pressure indicating absence of the tank hole for a predetermined period. Affirmation leads the processing to Step 340, while negation leads the processing to Step 350.

At Step 340, the system normality is set since no presence of the tank hole is assumed, a diagnosis completed history (D-COM-HISTORY) is set, and the processing is once terminated.

At Step 350, it is determined whether the pressurization history is present. Affirmation leads the processing to Step 370, while negation leads it to Step 360.

At Step 360, since the tank internal pressure is less than K2 and not yet pressurized, the pressure pump 29 is activated and the processing is once terminated.

At Step 370, it is determined whether the tank internal pressure is K3 or more and less than K2. Affirmation once terminates the processing, while negation leads the processing to Step 380.

At Step 380, since the tank internal pressure is low, it is determined whether a tank internal temperature variation is C1 or more. Affirmation once terminates the processing. Namely, when the tank internal pressure is low and variation of the tank internal temperature is large, a vehicle state is unstable and not suitable for executing the diagnosis processing. Probability of mis-detecting is thereby assumed to be high, so that the processing is once terminated after a diagnosis uncompleted history indicating that diagnosis is not completed is set at Step 420. By contrast, negation leads the processing to Step 390.

At Step 390, since the temperature is stable, it is determined whether the tank internal pressure becomes less than K3 after time T2 from completion of pressurizing. Affirmation means that slow decreasing of the tank internal pressure does not necessarily indicate abnormality, but does indicate possibility of abnormality, and leads the processing to Step 410. By contrast, negation means that rapid decreasing of the tank internal pressure indicates abnormality, and leads the processing to Step 400.

At Step 400, the system abnormality is set. Since the diagnosis processing is completed, a diagnosis completed history is set. The processing is then once terminated.

At Step 410, system interim abnormality is set. The processing is once terminated after a diagnosis uncompleted history (D-UNCOM-HISTORY) is set at Step 420.

The above processings enable setting the system normality, system interim abnormality, and system abnormality based on the internal pressure or temperature of the tank while the vehicle is traveling. Here, constant values of K1 to K3, C, T1, T2 are as follows.

K1: internal pressure of tank being maximally pressurized
K2: internal pressure of tank for determining normality of tank hole diagnosis
K3: internal pressure of tank for determining abnormality of tank hole diagnosis
C1: internal temperature variation of tank for determining that variation is large
T1: time for determining normality of tank hole diagnosis
T2: time for determining abnormality of tank hole diagnosis (i)-(4) Mid-Parking Abnormality Detecting Processing This is the processing at Step 220 shown in FIG. 3 for detecting abnormality of the tank hole of the fuel pump while the vehicle is being parked. Here, that the vehicle is being parked includes a state where the vehicle is not traveling. Similarly with the Mid-traveling abnormality detecting processing, rapidly decreasing internal pressure of the fuel tank 15 that is pressurized by the pressure pump 29 is assumed to result from presence of a tank hole. This case is also regarded as abnormality. However, since the processing is executed while the vehicle is being parked, unique processing such as processing of determining an elapsed time from stopping of the pump is included. Portions similar to the mid-traveling abnormality detecting processing will be abbreviated.

Figure 5:
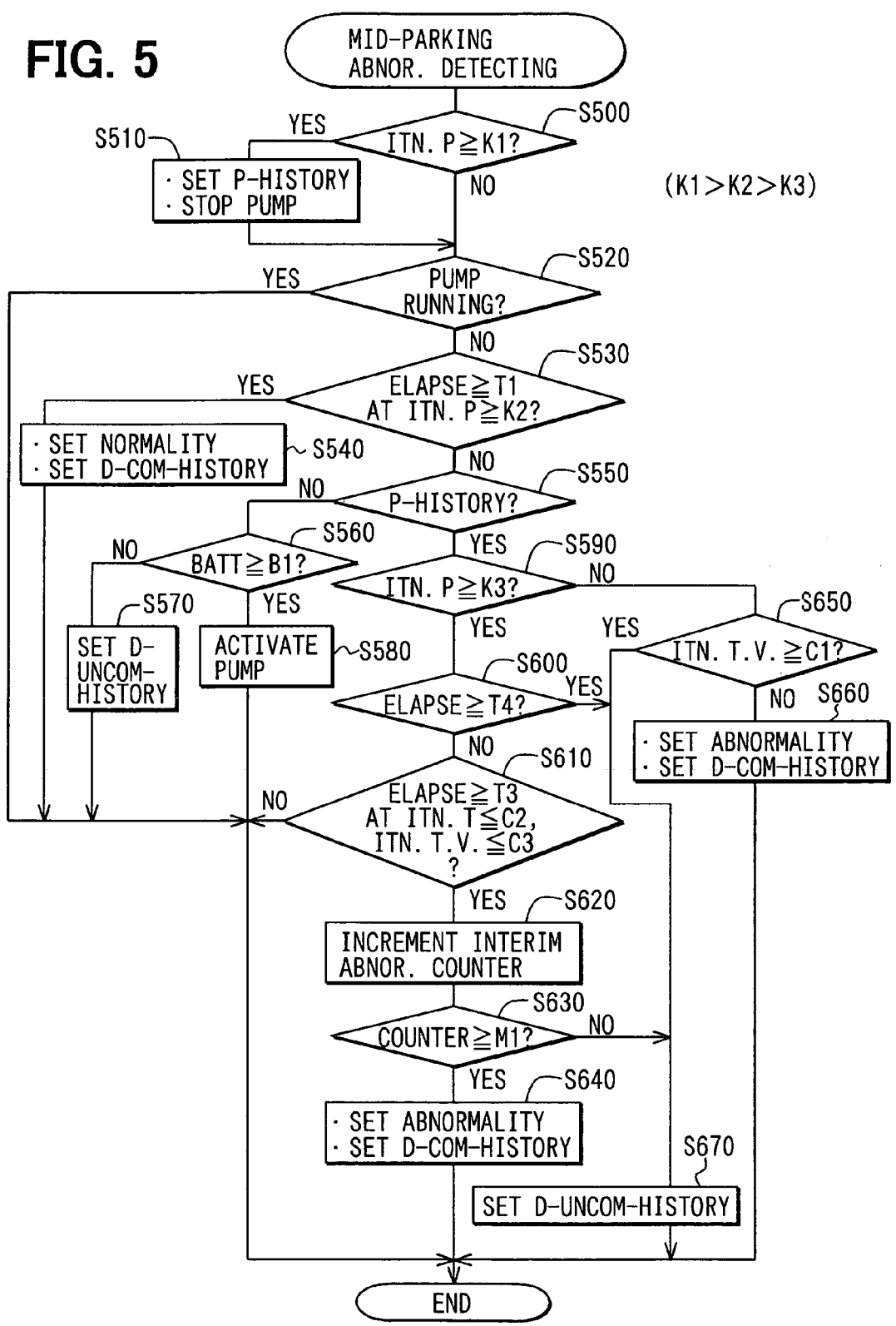
FIG. 5 is a flow chart diagram explaining abnormality detecting processing during parking according to the embodiment.

At Step 500 in FIG. 5, it is determined whether an internal pressure of the fuel tank 15 is K1 or more (here, K1>K2>K3). Affirmation leads the processing to Step 510, while negation leads the processing to Step 520.

At Step 510, a pressurization history is set for indicating that the pressurization is executed, and the pressure pump 29 is turned off.

At Step 520, it is determined whether the pressure pump 29 is running. While the pressure pump 29 is running, abnormality detecting is interrupted. Affirmation thereby terminates the processing, while negation leads the processing to Step 530. When the processing proceeds from Step 510 to Step 520, the pressure pump 29 is turned off. The processing thereby proceeds to Step 530 with negation.

At Step 530, it is determined whether the tank internal pressure remains K2 or more for time T1 or more. Affirmation leads the processing to Step 540, while negation leads the processing to Step 550.

At Step 540, system normality is set since no presence of the tank hole is assumed, a diagnosis completed history is set, and the processing is once terminated.

At Step 550, it is determined whether the pressurization history is present. Affirmation leads the processing to Step 590, while negation leads it to Step 560.

At Step 560, it is determined whether a battery voltage is a sufficient voltage B1 for activating the pressure pump 29. Affirmation leads the processing to Step 580. Negation leads the processing to Step 570.

At Step 580, the pressure pump 29 is activated and the processing is once terminated.

At Step 570, a diagnosis uncompleted history is set. The processing is then once terminated.

At Step 590, it is determined whether the tank internal pressure is K3 or more and less than K2. Affirmation leads the processing to Step 600, while negation leads the processing to Step 650.

At Step 650, since the tank internal pressure is low, it is determined whether a tank internal temperature variation is C1 or more. Affirmation leads the processing to Step 670. Namely, when the tank internal pressure is low and variation of the tank internal temperature is large, a vehicle state is unstable and not suitable for executing the diagnosis processing. The processing is thereby once terminated after a diagnosis uncompleted history indicating that diagnosis is not completed is set at Step 670. By contrast, negation leads the processing to Step 660.

At Step 660, system abnormality is set. Since the diagnosis processing is completed, a diagnosis completed history is set. The processing then once is terminated. Here, it is not determined whether the tank internal pressure becomes less than K3 after time T2 from completion of pressurizing. This is for inhibiting, through rapid determination, battery consumption while the vehicle is being parked.

At Step 600, it is determined whether it has passed time T4 since the pump stopped. It is because the battery consumption must be prevented when it passed long time since the pump stops. Affirmation leads the processing to Step 670. Here, the above-described processing is executed. Negation leads the processing to Step 610.

At Step 610, it is determined whether a condition, where the tank internal temperature is C2 or less and the tank internal temperature variation is C3 or less, continues for T3 or more. Negation once terminates the processing.

By contrast, affirmation leads the processing to Step 620. Here, the tank internal pressure remains in a little high pressure of less than K2 and not less than K3, so that whether a state of the tank internal is stable in a low temperature is not clearly determined. However, possibility of abnormality is assumed.

At Step 620, since the possibility of abnormality is present, an interim abnormality counter is incremented by one.

At Step 630, it is determined whether the interim abnormality counter reaches M1 or more. Negation leads it to Step 670 and the above-described processing is executed. Affirmation means that repeating the interim abnormality is determined to be in abnormality. Affirmation leads the processing to Step 640, where system abnormality is set and a diagnosis completed history is set. The processing is then once terminated.

The above processings enable setting the system normality, abnormality or interim abnormality, based on the internal pressure or temperature of the tank while the vehicle is being parked. Here, constant values of K1 to K3, C1 to C3, T1, T3, T4, M1, and B1 are as follows.

K1: internal pressure of tank being maximally pressurized

K2: internal pressure of tank for determining normality of tank hole diagnosis

K3: internal pressure of tank for determining abnormality of tank hole diagnosis C1: internal temperature variation of tank for determining that variation is large C2: internal temperature of tank for determining that temperature is low C3: internal temperature variation of tank for determining that variation is small T1: time for determining normality of tank hole diagnosis T3: time for determining abnormality of tank hole diagnosis T4: time for determining interrupting of tank hole diagnosis M1: times for determining interim abnormality in interim abnormality counter B1: voltage for determining pump operation possibility of battery (i)-(5) Main Relay Activating Time Determining Processing This is the processing at Step 110 shown in FIG. 2 for setting a proper diagnosing time according to a state of the vehicle.

Figure 6:
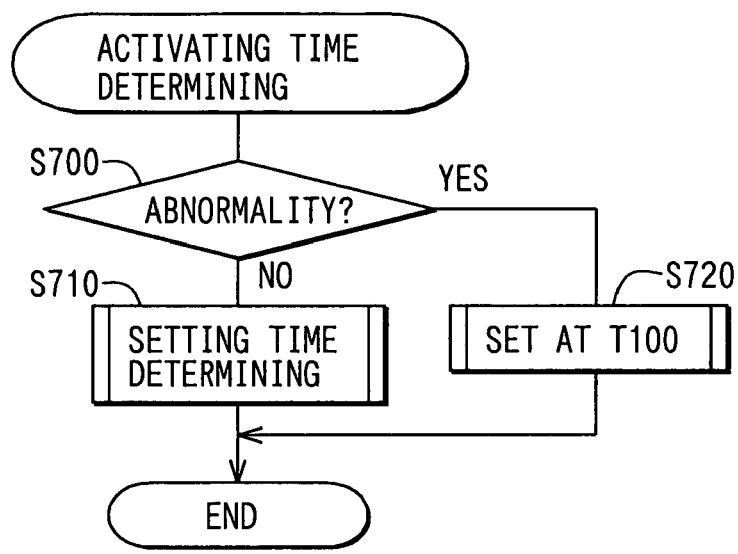
FIG. 6 is a flow chart diagram explaining determining processing of main relay activating time according to the embodiment.

At Step 700 in FIG. 6, it is determined whether the system is abnormal, namely whether the system abnormality is set in the processings in FIGS. 4, 5. Affirmation leads the processing to Step 720, while negation leads it to Step 710.

At Step 720, since the system abnormality is confirmed and there is no necessity for detecting abnormality while the vehicle is being parked, a diagnosing time is set at T100 that is a long time interval. The processing is then once terminated. Setting T100 at much longer time interval means practically terminating the diagnosis.

At Step 710, since the system abnormality is not confirmed and there is necessity for detecting abnormality at a proper diagnosing time, an after-described setting time determining processing takes place for obtaining a proper diagnosing time. The processing is then once terminated.

(i)-(6) Setting Time Determining Processing

This is the processing at Step 710 shown in FIG. 6.

Figure 7:
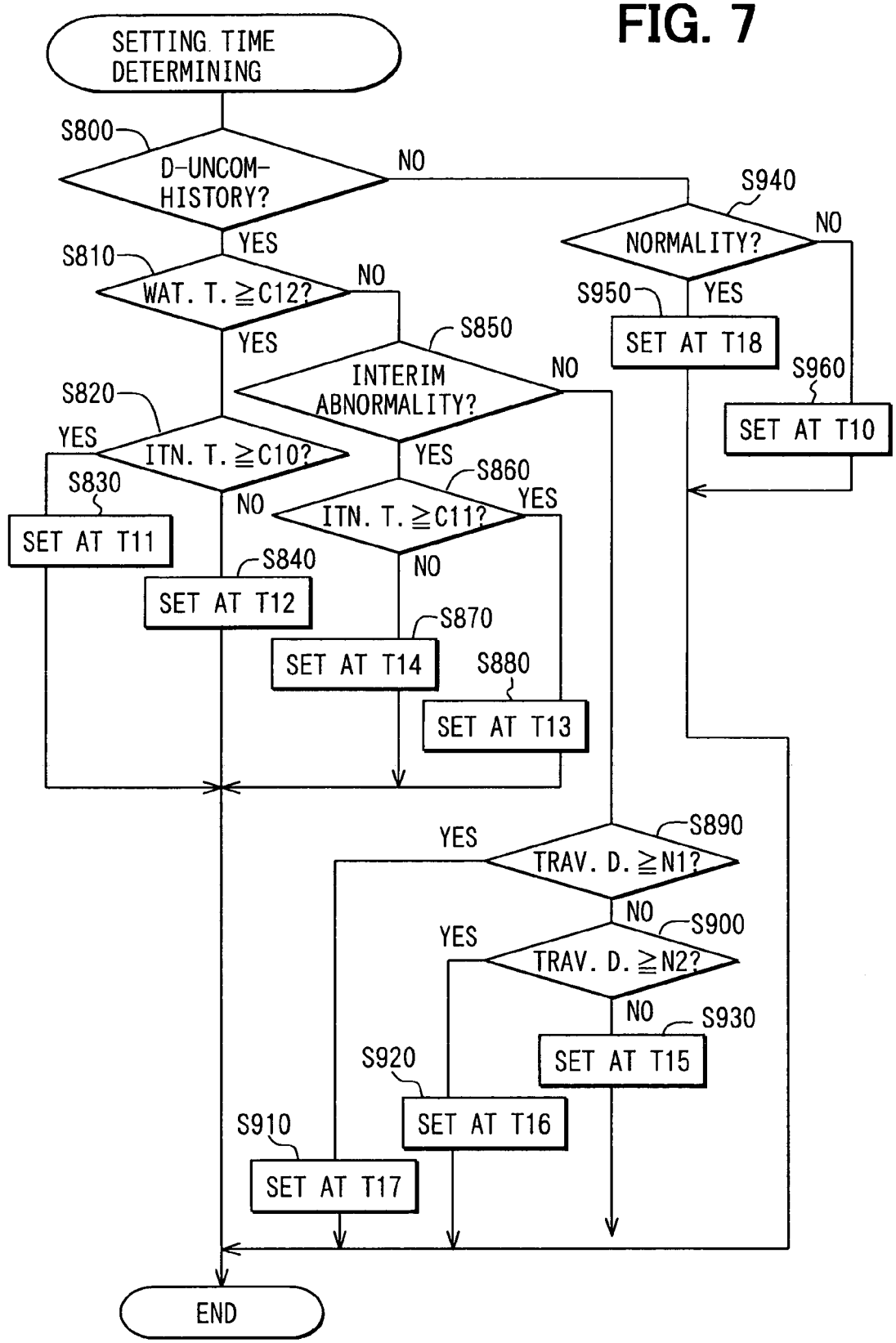
FIG. 7 is a flow chart diagram explaining determining processing of setting time according to the embodiment.

At Step 800 in FIG. 7, it is determined whether the diagnosis uncompleted history that indicates that the diagnosis is uncompleted is set. Affirmation leads the processing to Step 810, while negation leads it to Step 940.

At Step 940, it is determined whether the system is normal. Affirmation leads the processing to Step 950, while negation leads it to Step 960.

At Step 950, T18 is set as a diagnosing time while the system is normal. The processing is then once terminated.

At Step 960, T10 (T18>T10) is set as a diagnosing time corresponds to a state where the diagnosis uncompleted history is not set and the system is not normal. The processing is then once terminated.

At Step 810 entered from Step 800 with affirmation, it is determined whether a cooling water temperature is C12 or more. Affirmation leads the processing to Step 820, while negation leads it to Step 850.

At Step 820, it is determined whether a tank internal temperature is C10 or more. Affirmation leads the processing to Step 830, while negation leads it to Step 840.

At Step 830, diagnosing time T11 is set correspondingly to an unstable state where the cooling water temperature is high and the tank internal temperature is high. The processing is then once terminated.

At Step 840, diagnosing time T12 (T11>T12) is set correspondingly to a state where the cooling water temperature is high and the tank internal temperature is low. The processing is then once terminated.

At Step 850 entered from Step 810 with negation, it is determined whether the system interim abnormality is set. Affirmation leads the processing to Step 860, while negation leads it to Step 890.

At Step 860, it is determined whether the tank internal temperature is C11 (C10>C11) or more. Affirmation leads the processing to Step 880, while negation leads it to Step 870.

At Step 870, diagnosing time T14 is set correspondingly to a state where the cooling water temperature is low, the system interim abnormality is set, and the tank internal temperature is low. The processing is then once terminated.

At Step 880, diagnosing time T13 (T14<T13<T12<T11) is set correspondingly to a state where the cooling water temperature is low, the system interim abnormality is set, and the tank internal temperature is high. The processing is then once terminated.

At Step 890 entered from Step 850 with negation, it is determined whether a traveling distance is N1 or more. Affirmation leads the processing to Step 910, while negation leads it to Step 900.

At Step 910, diagnosing time T17 is set correspondingly to a long traveling distance. The processing is then once terminated.

At Step 900, it is determined whether a traveling distance is N2 (N1>N2) or more. Affirmation leads the processing to Step 920, while negation leads it to Step 930.

At Step 920, diagnosing time T16 is set correspondingly to an intermediate traveling distance. The processing is then once terminated.

At Step 930, diagnosing time T15 (T17<T16<T15) is set correspondingly to a short traveling distance. The processing is then once terminated. Here, it is assumed that possibility of abnormality occurrence becomes less when the traveling distance is shorter, so that a diagnosing time is set as being longer.

The above processings enable setting a proper diagnosing time, based on the traveling states of the cooling water temperature, the tank internal temperature, and the traveling distance. Here, constant values of C10 to C12, T10 to T18, N1, and N2 are as follows.

C10: tank internal temperature for determining whether temperature is high

C11: tank internal temperature for determining whether temperature is high while system interim abnormality is set C12: cooling water temperature for determining that temperature is high T10: diagnosing time while diagnosis uncompleted history is not set, and system is not normal T11: diagnosing time while cooling water temperature is high, and tank internal temperature is high T12: diagnosing time while cooling water temperature is high, and tank internal temperature is low T13: diagnosing time while cooling water temperature is low, and tank internal temperature is high T14: diagnosing time while cooling water temperature is low, and tank internal temperature is low T15: diagnosing time while cooling water temperature is low, and traveling distance is short T16: diagnosing time while cooling water temperature is low, and traveling distance is intermediate T17: diagnosing time while cooling water temperature is low, and traveling distance is long T18: diagnosing time while diagnosis uncompleted history is not set, and system is normal N1: traveling distance for determining whether traveling distance is long N2: traveling distance for determining whether traveling distance is intermediate (i)-(7) Main Relay Processing This is the processing at Step 120 shown in FIG. 2 for determining whether the engine ECU 5 is activated by a driver's manipulation or by automatic processing for diagnosing while the vehicle is being parked.

Figure 8:
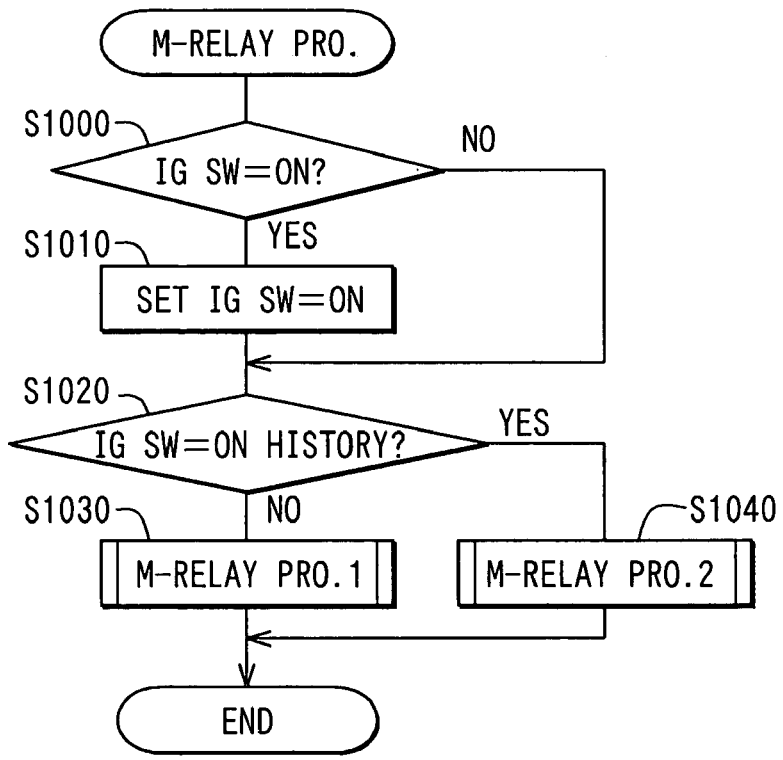
FIG. 8 is a flow chart diagram explaining processing of a main relay according to the embodiment.

At Step 1000 in FIG. 8, it is determined whether the IG SW 27 is in an ON state. Affirmation leads the processing to Step 1010, while negation leads it to Step 1020.

At Step 1010, an ON state history of the IG SW 27 is set. The processing is then proceeds to Step 1020.

At Step 1020, it is determined whether the ON state history of the IG SW 27 is set. Affirmation leads the processing to Step 1040, while negation leads it to Step 1030.

At Step 1030, since the ON state of the IG SW 27 is not set and the activation is thereby determined to be by automatic processing for diagnosing, main relay processing 1 takes place as described later. The processing is then once terminated.

At Step 1040, since the ON state of the IG SW 27 is set and the activation is thereby determined to be by driver's manipulation, main relay processing 2 takes place as described later. The processing is then once terminated.

(i)-(8) Main-Relay Processing 1

This is the processing at Step 1030 shown in FIG. 8 for automatic activating for diagnosing.

Figure 9:
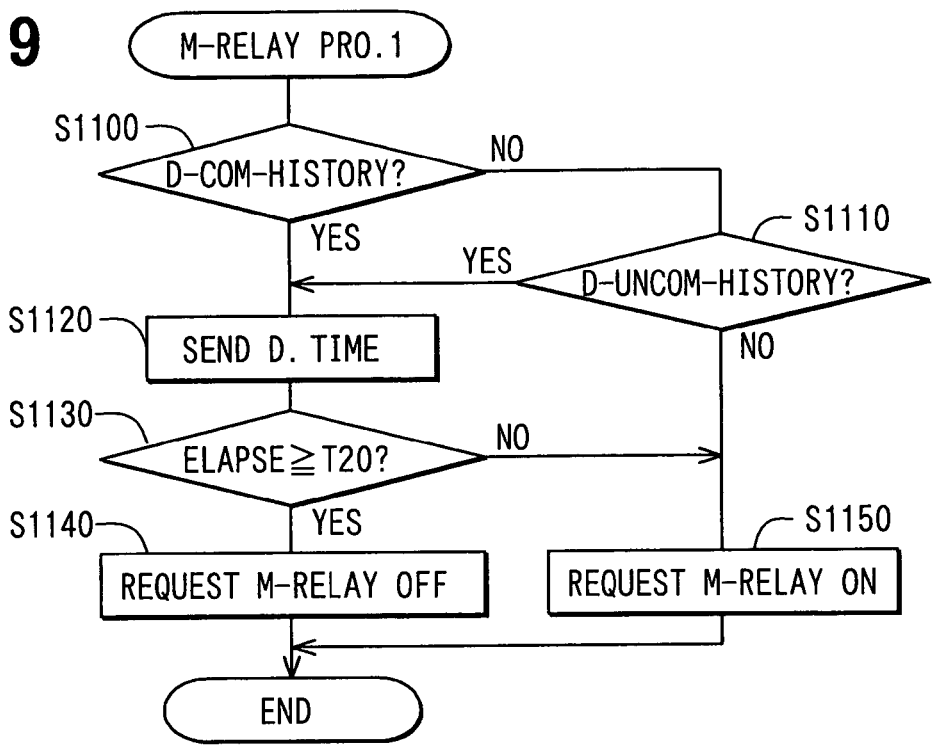
FIG. 9 is a flow chart diagram explaining processing 1 of the main relay according to the embodiment.

At Step 1100 in FIG. 9, it is determined whether the diagnosis completed history is set. Affirmation leads the processing to Step 1120, while negation leads it to Step 1110.

At Step 1110, it is determined whether the diagnosis uncompleted history is set. Affirmation leads the processing to Step 1120, while negation leads it to Step 1110. The processing is then proceeds to Step 1150.

At Step 1150, since the processing for diagnosis is not completed, a request output for turning on the main relay 11 is sent out. The processing is then once terminated.

At Step 1120 entered from Step 1100 with affirmation, since the processing for diagnosis is completed, a diagnosing time is sent to the power activating IC 7.

At subsequent Step 1130, it is determined whether it has passed time T20 necessary for sending the diagnosing time since it started sending the diagnosing time. Affirmation leads the processing to Step 1140, while negation leads it to Step 1150.

At Step 1140, since sending the diagnosing time is completed, a request output for turning off the main relay 11 is sent out. The processing is then once terminated.

The above processings enable tuning on the main relay 11 till the processing for diagnosing is completed and turning off the main relay 11 when the processing for diagnosing is completed.

(i)-(9) Main Relay Processing 2

This is the processing at Step 1040 shown in FIG. 8 for activating by the driver's request.

Figure 10:
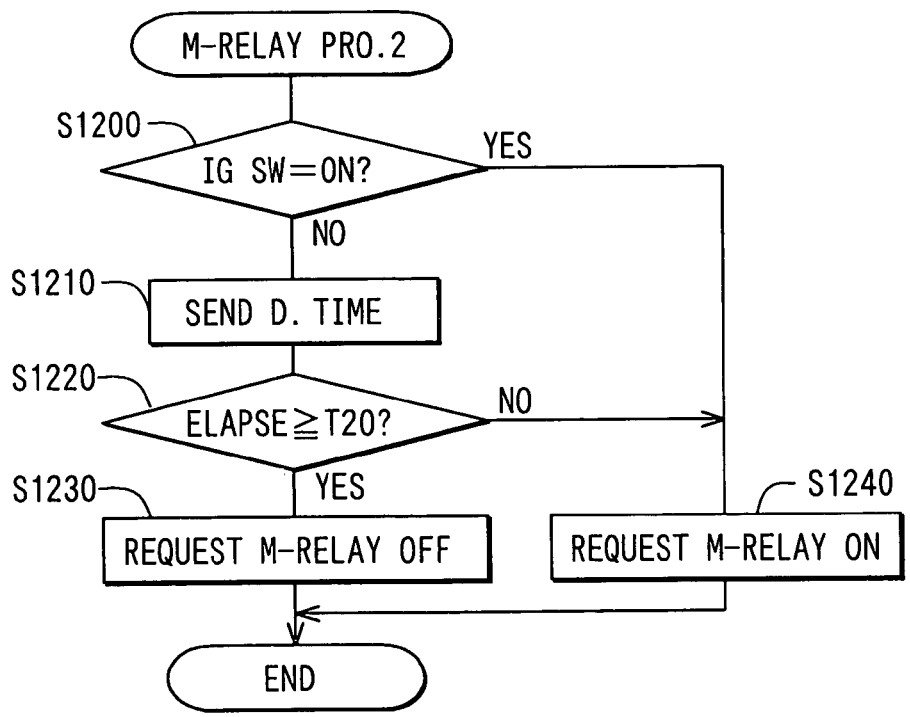
FIG. 10 is a flow chart diagram explaining processing 2 of the main relay according to the embodiment.

At Step 1200 in FIG. 10, it is determined whether the IG SW 27 is in an ON state. Affirmation leads the processing to Step 1240, while negation leads it to Step 1210.

At Step 1240, since the IG SW 27 is in the ON state, a request output for turning on the main relay 11 is sent out. The processing is then once terminated.

At Step 1210, by contrast, since the IG SW 27 is in the OFF state, a diagnosing time is sent to the power activating IC 7.

At subsequent Step 1220, it is determined whether it has passed time T20 necessary for sending the diagnosing time since it started sending the diagnosing time. Affirmation leads the processing to Step 1230, while negation leads it to Step 1240.

At Step 1230, since sending the diagnosing time is completed, a request output for turning off the main relay 11 is sent out. The processing is then once terminated.

The above processings enable tuning off the main relay 11 after the diagnosing time is sent out when the IG SW 27 is turned off (e.g., after the vehicle travels).

(ii) Processing of the Power Activating IC

Processing of the power activating IC 7 when a diagnosing time or the like is received from the microcomputer 3.

(ii)-(1) Power Activating IC Processing

The power activating IC 7 receives a signal indicating an ON/OFF state of the IG SW 27 therefrom. It also receives, from the microcomputer 3, a request output for turning on/off the main relay 11 and a diagnosing time. Based on the received signal and the like, the power activating IC 7 sends out a main relay activating output to the switching element 31 for controlling the main relay 11.

Figure 11:
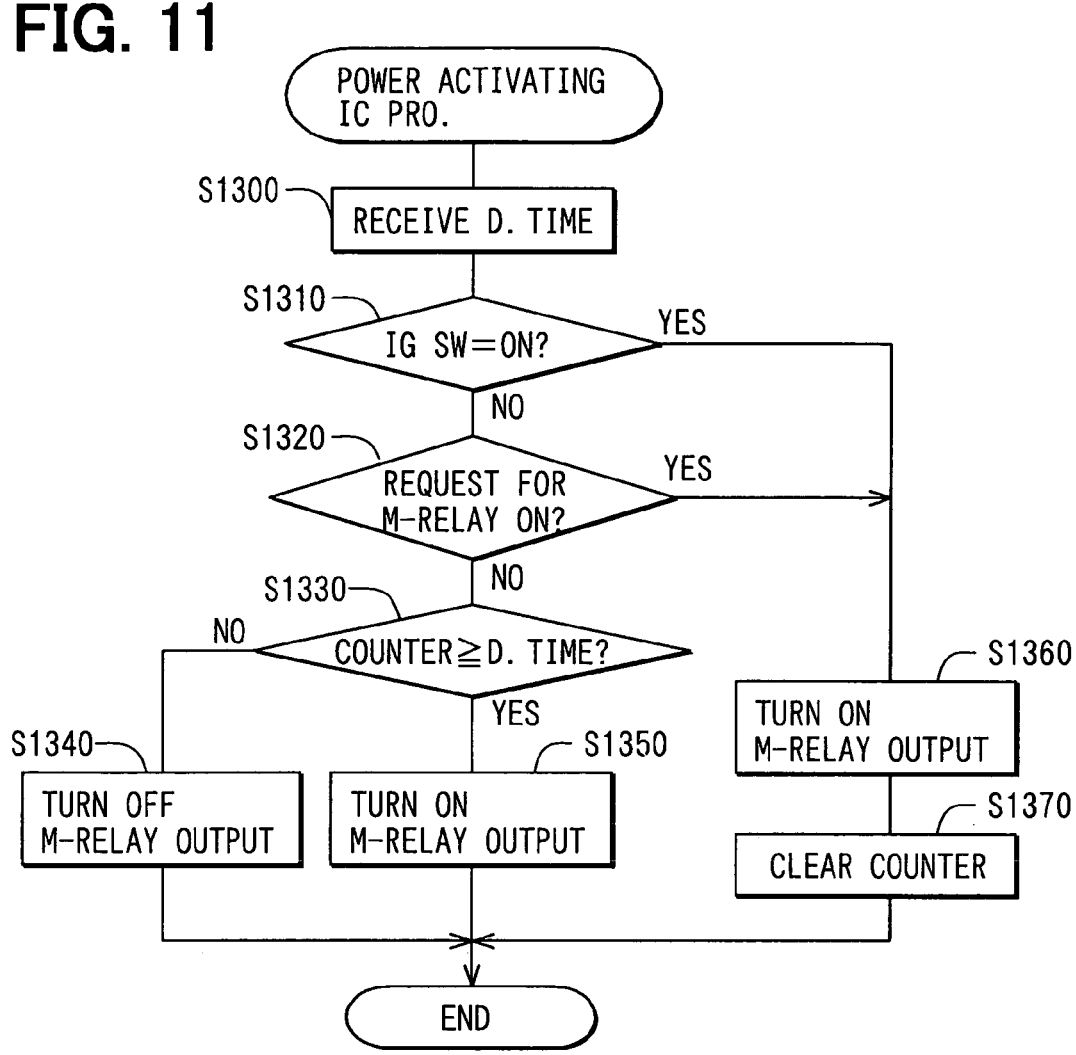
FIG. 11 is a flow chart diagram explaining processing of a power activating IC according to the embodiment.

At Step 1300 in FIG. 11, processing takes place for receiving, from the microprocessor 3, the diagnosing time and the request output for turning the main relay 11 on/off.

At subsequent Step 1310, it is determined whether the IG SW 27 is in an ON state. Affirmation leads the processing to Step 1360, while negation leads it to Step 1320.

At Step 1360, a main relay activating output is turned on so that power supply to the microcomputer 3 can be started. This enables the switching element 31 to operate to start power supply to the microcomputer 3.

At subsequent Step 1370, an activating interval counter for detecting an activating interval is cleared. The processing is then once terminated.

At Step 1320 entered from Step 1310 with negation, it is determined whether a request for turning on the main relay 11 is present. Affirmation leads the processing to above-described Step 1360 where the main relay activating output is turned on, while negation leads it to Step 1330.

At Step 1330, it is determined whether the activating interval counter is a diagnosing time or more, i.e., whether it reaches an activating time for starting diagnosis. Affirmation leads the processing to Step 1350, while negation leads it to Step 1340.

At Step 1340, since it does not reach the diagnosing time, the main relay output is set in an OFF state. The processing is then once terminated.

At Step 1350, since it reaches the diagnosing time, the main relay output is set in an ON state so that the power supply to the microprocessor 3 can be started. The processing is then once terminated.

The above processings enable power supply to the microprocessor 3 to be started at the necessary timing such as the diagnosing time.

(ii)-(2) Power Activating Counter Processing

Figure 12:
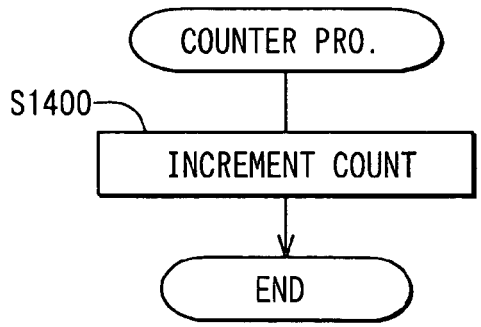
FIG. 12 is a flow chart diagram explaining processing of an activating time interval according to the embodiment.

This is processing for counting up, each one minute, the above-described activating interval counter. Namely, as shown in FIG. 12 at Step 1400, the activating interval counter is incremented every one minute.

This enables detecting an elapsed time from starting of power supply to the microprocessor 3, and thereby turning on the microprocessor 3 after the set diagnosing time elapses from turning off of power of the microcomputer 3.

In the next place, effects of this vehicular abnormality detecting device of the embodiment will be explained below.

A diagnosing time of activating a microprocessor 3 (i.e., engine ECU 5) for detecting presence of a hole of the fuel tank 15 is set based on vehicular states such as a cooling water temperature or a traveling distance before the vehicle is parked. Therefore, the microcomputer 3 can be activated at a proper timing to detect abnormality. This enables securely detecting vehicle abnormality, which results in enhancing accuracy in malfunction diagnosis.

Proper frequency of detecting abnormality restricts excessive activating of the microcomputer 3, which results in decreasing power consumption of the battery 13.

Furthermore, when a result of the preceding abnormality detecting shows that the vehicle is abnormal, abnormality detecting this time cannot be executed. This also results in decreasing frequency of uselessly activating the microcomputer 3.

Furthermore, when abnormality detecting is executed while the vehicle is traveling, a time interval for detecting is set based on a result of the preceding abnormality detecting. If the abnormality is not detected in the preceding detecting, the time interval for detecting is set at a longer time interval. Frequency of uselessly activating the microcomputer 3 is thereby decreased.

In this embodiment, a power activating IC 7 that consumes less than the microprocessor 3 is used for activating the microcomputer 3. This inhibits useless use of the battery 13.

The present invention is directed not only to the above embodiment, but also to others.

For instance, abnormality detecting is not only for a tank hole of a fuel tank, but also for airtightness in passages of the fuel tank, e.g., evaporator abnormality detecting.

Furthermore, although a diagnosing time is set based on a vehicular state such as a cooling water temperature and a tank internal temperature, it can be also set based on an intake air temperature. Namely, when the intake air temperature is high, it needs additional time to reach a stable state which is suitable for detecting abnormality. The diagnosing time is therefore set as being long not only when the cooling water is high or the tank internal temperature is high, but also when the intake air temperature is high.

In the above embodiment, an abnormality detecting device is explained. However, the present invention can be directed to a program executing processing according to the above-described algorism, or a storage media storing the program. Here, the storage media can be an electronic control unit constructed of a microcomputer, a micro chip, a flexible disk, a hard disk, an optical disk, a CD-ROM, and the like, which only need to store the above program and be read by a computer. Furthermore, the program can be stored in a ROM, a backup RAM, and the like, which can be assembled in a computer.

Furthermore, the program is not limited to being stored in the storage media, but it can be sent or received through a communications network such as the Internet.

It will be obvious to those skilled in the art that various changes may be made in the above-described embodiments of the present invention. However, the scope of the present invention should be determined by the following claims.

What is claimed is:

1. An abnormality detecting device for executing abnormality detecting of a vehicle after and while an ignition switch of the vehicle is turned off, the abnormality detecting device comprising:

activating means for causing an electronic control unit of the vehicle to automatically activate the electronic control unit itself so that the abnormality detecting is executed after and while the ignition switch is turned off; and interval setting means for setting a time interval at which the activating means causes the electronic control unit to automatically activate itself, wherein the time interval is set based on a vehicular state before the ignition switch is turned off.

2. The abnormality detecting device according to claim 1, wherein the vehicular state relates to a traveling state where the vehicle traveled before the ignition switch is turned off.

3. The abnormality detecting device according to claim 1, wherein the vehicular state includes a traveling distance for which the vehicle traveled before the ignition switch is turned off.

4. The abnormality detecting device according to claim 3, wherein, when the traveling distance of the vehicle is long, the time interval is set as being short, and wherein, when the traveling distance of the vehicle is short, the time interval is set as being long.

5. The abnormality detecting device according to claim 1, wherein the vehicular state before the ignition switch is turned off includes at least one of a cooling water temperature of an engine of the vehicle, an internal temperature of a fuel tank of the vehicle, and an intake air temperature.

6. The abnormality detecting device according to claim 1, wherein said time interval is set based on a result of a previously executed abnormality detecting.

7. The abnormality detecting device according to claim 1, wherein the abnormality detecting is selectively cancelled based on a result of a previously executed abnormality detecting.

8. The abnormality detecting device according to claim 1, wherein said time interval is set based on a result of an abnormality detecting of the vehicle that was executed while an engine of the vehicle was running before the ignition switch is turned off.

9. The abnormality detecting device according to claim 8, wherein the abnormality detecting of the vehicle that was executed while the engine of the vehicle was running was executed while the vehicle was traveling.

10. The abnormality detecting device according to claim 1, wherein the activating means is included in another electronic control unit consuming less electric power than the electronic control unit that is activated by the activating means.

11. The abnormality detecting device according to claim 1, wherein the abnormality detecting is executed regarding airtightness of a fuel tank of the vehicle.

12. A program storage media readable by a computer, tangibly embodying an abnormality detecting program of instructions executable by the computer to perform method steps for executing abnormality detecting of a vehicle after and while the ignition switch of the vehicle is turned off, the method steps including:

a step of setting a time interval at which an electronic control unit of the vehicle is activated after and while the ignition switch is turned off, wherein the time interval is set based on a vehicular state before the ignition switch is turned off; and a step of causing the electronic control unit of the vehicle to automatically activate the electronic control unit itself at the time interval set at the step of setting the time interval so that the abnormality detecting is executed after and while the ignition switch is turned off.

13. An abnormality detecting method for executing abnormality detecting of a vehicle after and while the ignition switch of the vehicle is turned off, the abnormality detecting method comprising:

setting a time interval at which an electronic control unit of the vehicle is to be activated after and while the ignition switch is turned off, wherein the time interval is set based on a vehicular state before the ignition switch is turned off; and causing the electronic control unit of the vehicle to automatically activate the electronic control unit itself at the time interval set at the step of setting the time interval so that the abnormality detecting is executed after and while the ignition switch is turned off.

* * * * *